Dec. 16, 1952  A. ELCE ET AL  2,622,098
MANUFACTURE OF ACETIC ANHYDRIDE
Filed Jan. 29, 1952
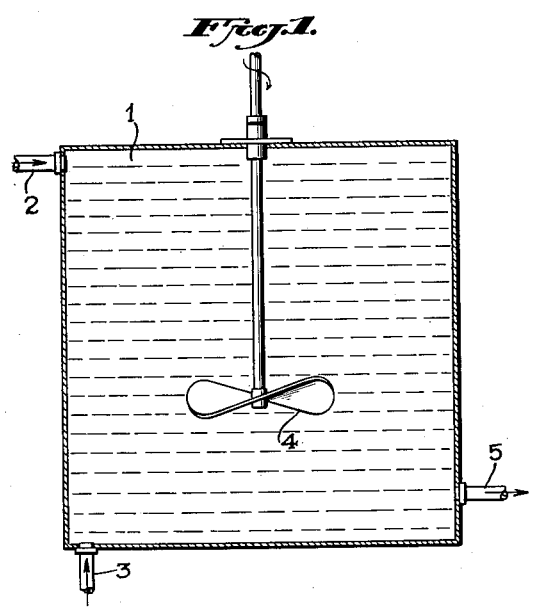
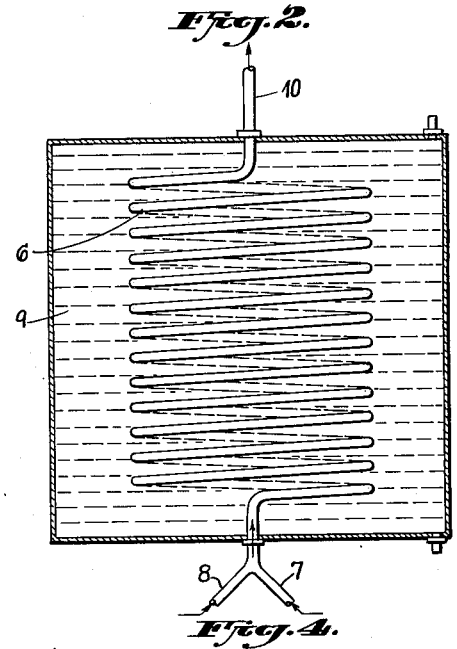
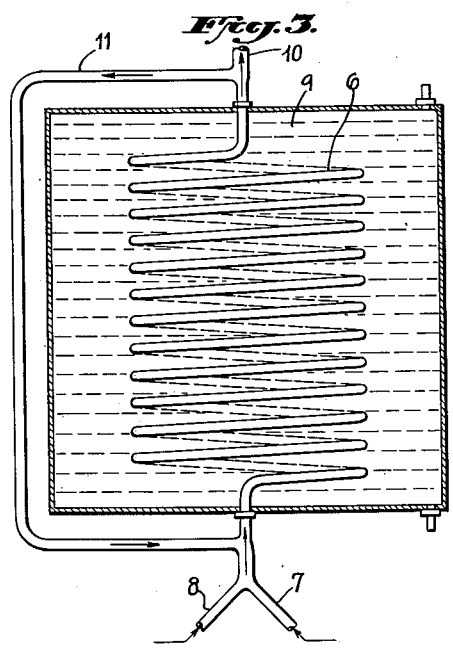
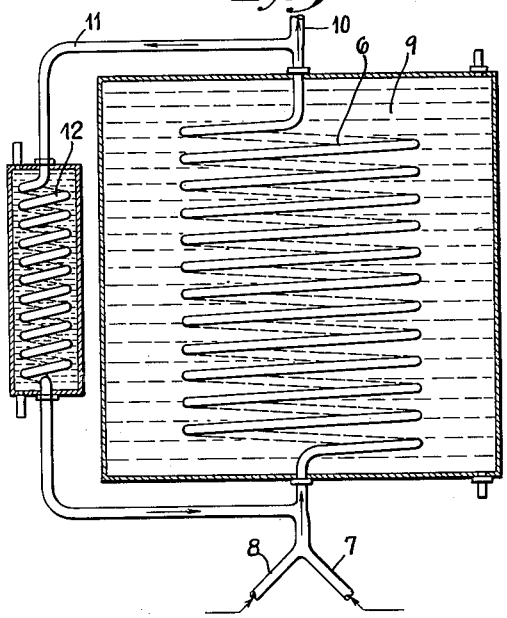
INVENTORS.
ALEC ELSE.
HERBERT MUGGLETON STANLEY.
KARL HEINRICH WALTER TURCK
BY Ward Crosby & Neal
their ATTORNEYS.

Patented Dec. 16, 1952

2,622,098

UNITED STATES PATENT OFFICE 2,622,098

MANUFACTURE OF ACETIC ANHYDRIDE

Alec Elce, Banstead, Herbert Muggleton Stanley, Tadworth, and Karl Heinrich Walter Turck, Banstead, England, assignors to The Distillers Company Limited, Edinburgh, Scotland, a British company Application January 29, 1952, Serial No. 268,734
In Great Britain March 15, 1946

7 Claims. (Cl. 260—546)

The present invention is a continuation-in-part of our patent application Serial No. 733,174, filed on March 7, 1947, and now abandoned. It relates to an improvement in the process for the manufacture of acetic anhydride.

It has been stated in prior British patent specification No. 446,259 that in the oxidation of acetaldehyde the yield of acetic anhydride reaches a maximum when the conversion of acetaldehyde into its oxidation products is conducted to a limit of about 70% and that it falls off thereafter when the oxidation is continued. This decrease could not be explained by any increase in the hydrolysis of acetic anhydride initially produced or a decrease in the rate of oxidation. The general theory as to the mechanism of the oxidation of acetaldehyde to acetic anhydride which has hitherto been generally accepted in the art has been that the essential intermediate compound has been peracetic acid and that the acetic anhydride has been produced by the interaction of 1 molecule of peracetic acid with 1 molecule of acetaldehyde and, accordingly, in the prior art processes it has been usual to adopt reaction conditions which it was thought were favourable to the production of the peracetic acid and its substantially instantaneous reaction with free acetaldehyde.

The whole attention of earlier workers in connection with the process for the oxidation of acetaldehyde to acetic anhydride has been directed to controlling the reaction conditions and the working up of the reaction mixture to endeavour to secure conditions in which the hydrolysis of the acetic anhydride present in the reaction mixture was minimised.

It has been suggested that the drop in acetic anhydride concentration in the reaction mixture as referred to in the above-mentioned prior specification is due to the fact that initially-formed anhydride has reacted with co-produced peracetic acid. As a result of this last reaction, acetyl peroxide was said to be formed (see Heatley, Can. J. Res., vol. 19, pp. 261-273). On further analysis, the author assigned to this side reaction of acetic anhydride with peracetic acid, as may be seen from a study of the curve numbered 4 on page 271 of the above reference, a reaction rate of the same magnitude as that of the main reaction between acetaldehyde and peracetic acid.

It has therefore been considered essential when carrying out the reaction in the absence of diluents, as described in prior British patent specification No. 446,259, to oxidise in the presence of an excess of acetaldehyde and, when the oxidation is carried out as a continuous process to oxidise only to such an extent that the total acids in the reaction mixture amount to about 40% to 50%; the figure of total acids being the value obtained by titration of the reaction mixture when, of course, the acetic anhydride is hydrolysed to acetic acid. Thus, in this continuous process one half, or more, of the acetaldehyde remains unoxidised and thus serves to dilute the acetic anhydride formed. In this manner too high a concentration of the acetic anhydride in the reaction zone was avoided. Although a rapid oxidation of the acetaldehyde seemed desirable from the point of view of restricting the time of hydrolysis of the acetic anhydride formed, it was considered essential to keep the anhydride concentration in the mixture low, and that of acetaldehyde high. Thus, the highest concentration of acetic anhydride in the mixture resulting from the oxidation reaction amounted to about 30% by weight as reported in the literature. This figure had been obtained in a batch process using acetic acid as a diluent.

The present invention arises out of considerable research work which we have carried out on this process for the oxidation of acetaldehyde to acetic anhydride and our experimental results have led us to formulate a reaction mechanism which is quite different from that hitherto generally accepted and referred to above.

The conclusions which we have drawn are that the oxidation of acetaldehyde proceeds, at least in part, directly to acetic anhydride, that is to say that the acetic anhydride is formed as a primary product and not as the result of the interaction of acetaldehyde with any intermediate oxidation product thereof and we have found that, in order that the best yields of acetic anhydride may be produced, it is necessary to choose conditions which are deliberately chosen to minimise, so far as is possible, the formation of the percompounds which, on the previously accepted theory, were a necessary intermediate in the production of acetic anhydride.

It is an object of the present invention to provide a process yielding reaction mixtures containing a higher concentration of acetic anhydride than hitherto obtained, e. g. more than 40% by weight.

It is a further object of the invention to dispense with the use of any substantial quantity of added diluents or of acetic acid beyond that quantity which is formed during the reaction or which is employed for the addition of the catalyst, an amount which does not generally exceed about 10% by weight of the acetaldehyde feed.

According to the present invention there is provided a continuous process for the production of acetic anhydride by the liquid phase catalytic oxidation of acetaldehyde by means of molecular oxygen at 45–55° C. with the aid of a copper and cobalt catalyst which comprises bringing molecular oxygen into intimate contact with a mixture containing acetic acid, acetaldehyde, at least 40% of acetic anhydride and an amount of water resulting from the reaction of acetaldehyde to produce such acetic anhydride, in which mixture is dissolved a copper-cobalt catalyst in an amount so that the concentration of the resulting copper compound, expressed in terms of metallic copper, is between 0.05% and 0.5%, and of the resulting cobalt compound, expressed in terms of metallic cobalt, is between 0.02% and 0.2%, continuously withdrawing a part of the reaction mixture and replacing said part by fresh acetaldehyde and catalyst to keep the concentration of catalyst in the reaction mixture within said limits, adjusting the withdrawal and the replacement in such a manner that the residence time of the reaction mixture in the system is not more than half an hour, continuously introducing molecular oxygen at such a rate that the acetic anhydride content in the reaction mixture is maintained at 40% at least, and the concentration of acetaldehyde therein between 2 to 7% and recovering the acetic anhydride from the part which is withdrawn. The percentage figures referred to throughout the specification are, unless otherwise stated, percentage figures calculated on a weight by volume basis i. e. grams contained in 100 ccs. By using in the following description and claims the expression copper catalyst or cobalt catalyst respectively, it is to be understood that these metals may be introduced into the reaction mixture in the form of a soluble compound thereof for instance in the form of their acetates.

The concentration of the catalyst is stated in terms of the metal content thereof and the actual amount which is necessary will depend, at least to a certain extent, upon the temperature at which the reaction is carried out. The lower the reaction temperature the larger are the amounts of cobalt catalyst which will be required. In general, the amounts of cobalt catalyst required will be from 0.02% to 0.2% and preferably from 0.02% to 0.05%.

The fact that a residence time of not more than half an hour is specified means that the average time for which any given part of the reaction mixture is in the reaction system is not more than half an hour and this means that, in carrying the process of this invention into effect, there are produced per litre per hour at least twice the weight of liquid reaction products as is contained at any given time in the reaction system.

Various reaction systems may be utilised in carrying the invention into effect, for example, the reaction may be carried out in a normal oxidising vessel provided with the necessary very efficient cooling means to prevent the temperature of the reaction mixture getting out of control, the acetaldehyde being fed into the oxidiser at one part and the reaction mixture being withdrawn from the vessel at another part whilst effective stirring means are provided for ensuring the necessary intimate contact between the molecular oxygen and the reaction mixture. The process may also be carried out by utilising a reaction system in which the oxidiser is a tubular reactor into one end of which the acetaldehyde is fed and from the other end of which the reaction mixture is removed, whilst a recirculating system may also be employed in which a part of the reaction mixture issuing from the reactor is recirculated again through the reactor. In such a case the reactor is preferably a tubular reactor which is most conveniently in the form of a coil.

The very high rates of oxidation which are necessary in accordance with the present invention are achieved by the utilisation of gases which are richer in oxygen than is air, for example, pure oxygen or commercial oxygen usually of a purity of 95 to 98% by volume may be used, whilst oxygen of a purity of 85% may also be used. Superatmospheric pressures advantageously ranging from 1 to 5 atmospheres may be employed and a very efficient mixing of the gaseous and liquid phases is necessary in order to obtain sufficiently intimate contact between the molecular oxygen and the reaction mixture.

In addition, an effective oxidation catalyst or mixture of catalysts, in addition to the cobalt catalyst, may be used and we have found that a particularly advantageous catalyst mixture is a mixture of cobalt and copper. It will be understood that the catalysts are used in a form in which they are or can become soluble in the reaction mixture and they may be added to the reaction mixture in any convenient manner.

The use of a mixture of cobalt and copper as a catalyst mixture for the oxidation of acetaldehyde is, of itself, well known, but we have found that there is an optimum composition of the mixed catalyst which results in particularly good primary yields of acetic anhydride. For example, although the copper catalyst may be used in any amount up to 0.5% it is preferable to use amounts of 0.1% to 0.3% and generally amounts of not substantially less than 0.05% of copper should be used. By the use of such a catalyst mixture, the primary yield of acetic anhydride is in the neighborhood of 90% and may rise to a value approaching the theoretical yield based on the acetaldehyde oxidised to liquid products.

Amounts of cobalt greater than 0.05%, when used in conjunction with copper, tend slightly to diminish the yield of acetic anhydride ultimately obtained. The reference to the primary acetic anhydride is to be understood as being a reference to that amount of acetic anhydride which can be calculated from an analysis of the ultimate reaction product, the calculation consisting in determining the rate of hydrolysis of acetic anhydride in the reaction mixture under the reaction conditions and calculating back from the figure actually achieved to the figure which was initially formed by the addition of the amount calculated to have been hydrolysed during the reaction. The references, therefore, to "primary anhydride yield" mean the figure calculated as being the amount of acetic anhydride directly produced from the acetaldehyde and references to "ultimate anhydride yield" means the yields of acetic anhydride actually recovered from the reaction mixture as such.

When cobalt alone is employed as catalyst the maximum yield of acetic anhydride produced primarily does not exceed 70%. Copper catalysts alone furnish a primary yield of not more than 60% of anhydride.

The following table gives the results of tests carried out under comparable conditions. The concentration of acetaldehyde in the reaction mixture entering the reaction zone was kept uniformly at about 5% and the temperature in the reaction zone at 50° C.

The determinations were made when the oxidation was at steady state, the reaction mixture being withdrawn and acetaldehyde fed in to make up the quantities which had been converted by oxidation and/or removed with the withdrawn reaction mixture and/or carried away in the escaping gas mixture. The rate of hydrolysis of anhydride at the given concentration was determined separately, and from the figures obtained the loss of anhydride by hydrolysis during the time the reaction mixture was in the system was calculated. This figure, added to that obtained from the estimation of anhydride present in the withdrawn reaction mixture ("ultimate anhydride yield"), furnished the figure for the "primary anhydride yield."

|  | Catalyst | | Primary anhydride, yield, Percent | Ultimate anhydride, yield, Percent |
|---|---|---|---|---|
|  | Co, Percent w./v. | Cu, Percent w./v. | | |
| 1 | 0.02 | nil | 54 | 31 |
| 2 | 0.05 | nil | 55 | 40 |
| 3 | 0.2 | nil | 61 | 47 |
| 4 | 0.01 | 0.03 | --- | --- |
| 5 | 0.02 | 0.03 | 60 | 40 |
| 6 | 0.05 | 0.03 | 79 | 51 |
| 7 | 0.2 | 0.03 | 73 | 55 |
| 8 | 0.01 | 0.1 | --- | --- |
| 9 | 0.02 | 0.1 | 94 | 65 |
| 10 | 0.05 | 0.1 | 88 | 63 |
| 11 | 0.2 | 0.1 | 87 | 52 |
| 12 | 0.009 | 0.3 | --- | --- |
| 13 | 0.01 | 0.3 | 94 | 62 |
| 14 | 0.02 | 0.3 | 98 | 66 |
| 15 | 0.05 | 0.3 | 87 | 61 |
| 16 | 0.2 | 0.3 | 83 | 58 |

It was not possible to work up the reaction mixture obtained in experiments 4, 8, and 12 because of the high percentage of per-compounds contained therein and it is therefore not possible to give figures for the anhydride yields in these cases.

The very high primary yields of 90% and over of acetic anhydride obtained by carrying out our process is a proof that the catalyst mixture in the proportions as indicated above exerts, under the conditions and circumstances of the present invention, a definite directive action inasmuch as acetic anhydride is chiefly, or possibly even exclusively, formed as primary product.

On account of the difficulty of dissolving the copper catalysts in acetic acid, we prefer to introduce for instance the acetates of copper and also of cobalt into the mixture to be treated with oxygen either continuously or intermittently in a finely divided form, as for example a powder mixed with the oxidising gases, or suspended in acetaldehyde or acetic acid, or a mixture of both. The cobalt catalyst is easily soluble in the reaction mixture. The cobalt catalyst may be added in conjunction with the copper catalyst or separately. The process does not require the addition of an extraneous diluent, but we have found that when the catalysts are added suspended in either acetic acid or acetaldehyde the small quantities of diluent liquid or liquids do not interfere to an appreciable extent with the efficiency of our process. If desired, acetic acid may be added to the reaction mixture provided that the quantities thereof added do not lower the concentration of acetic anhydride below the figure of 40% above stated.

The oxidation reaction may be effected with advantage by circulating the reaction mixture through narrow, externally cooled tubes at such a speed that a considerable back pressure of about 15 lbs. gauge or more is produced. Such tubular reactors are described in our copending British Patent 628,034, in which oxygen is forced into the inlet end of the reactor and thus emulsified the gas and liquid very efficiently.

It is undoubtedly surprising that the comparatively small amounts of cobalt present in the reaction mixture should be sufficient to reduce the concentration of per-compounds in the reaction mixture and to keep their amount within admissable and safe limits. It is equally surprising that the ratio of water to acetic acid in the reaction mixture is as high as 1:5, and may even reach 1:3.4 when operating the process of this invention. Previous investigators have stated that for carrying out the oxidation safely in a continuous process, the water content of the liquid mixture in the reaction zone should not exceed 10% (British patent specification No. 514,268). Others have found that the oxidation rate decreases greatly when the water content in the acetic acid increases, and have stated that an increase of 12% (a drop from 93% to 81% of acetic acid in the acetic acid : water concentration) results in the reduction of the oxygen absorption to as much as one-quarter of its previous value (Ind. Eng. Chem., 1929, vol. 21, pp. 12–27).

Special care has to be taken to remove the heat of reaction from the system, if necessary by external cooling by means of a low temperature cooling liquid. One way of efficient cooling consists in dividing the reaction mixture being recirculated in the system and passing a part of it through a cooler, after which it is re-introduced with the remainder into the reactor. In the latter case, however, it is necessary to circulate the liquid through the cooler at such a speed that the anhydride concentrations in the cooled part of the liquid and the remainder of the liquid are practically the same, so that the acetic anhydride yield is not affected.

The thorough cooling of the reaction mixture is of particular importance as it helps to regulate the amount of percompounds in the reaction mixture. We have found that it is essential for the most efficacious working of the process according to our invention to maintain the quantity of percompounds present in the mixture not only at the low level of 1%, and less, but also at a uniform level. A drop of the temperature in the reaction zone of a few degrees will lead to a not inconsiderable increase in the percompound content in the reaction mixture. By virtue of their high exothermic value these percompounds on decomposing and reacting with the acetaldehyde and acetic acid in the liquid will evolve so much heat that it is extremely difficult to adjust the temperature properly as it is liable to overshoot the preferred temperature, say 50° C., at which the process is carried through to the best advantage. Too high a temperature will favour the hydrolysis of acetic anhydride. A decrease of temperature, on the other hand, will lead to the formation of an excessive amount of percompounds with its inherent hazards of explosions and the difficulty of temperature regulation just mentioned. Only by very careful adjustment of the temperature in the reactor, the regular flow of oxygen into the reaction mixture and the intimate contact of the gaseous phase with the liquid reaction mixture in conjunction with the addition of cobalt in order to keep the quantity of percompounds at the low level of less than 1%, can irregularities in the formation of the percompounds be avoided.

The process when carried out according to our invention yields acetic anhydride concentrations which are higher than any obtained hitherto. Thus, for instance, it is possible to withdraw a reaction liquid, from the reaction system when it is in the steady state, containing more than 45% of acetic anhydride when the acetaldehyde concentration in the feed to the reactor was maintained at a value as low as 3%. In addition, it offers various other advantages. Only a small amount of acetaldehyde requires to be separated from the reaction mixture when the latter is worked up for the recovery of the acetic anhydride produced, in consequence of the very low acetaldehyde concentration in the reaction mixture issuing from the oxidation zone. This reduces considerably the loss of acetaldehyde from the system. Furthermore, the acetaldehyde vapour pressure over the reaction mixture is much lower compared with mixtures containing large quantities of acetaldehyde, whereby losses by evaporation are largely avoided. From this it also follows that the gases leaving the reaction zone contain less acetaldehyde vapours admixed with them. The reaction mixture leaving the reactor and containing only 2-7% acetaldehyde may be subjected directly to vacuum distillation without requiring any preliminary acetaldehyde stripping operation. This stripping off is not only costly, but requires also a considerable time, which entails additional hydrolysis of the acetic anhydride primarily produced and thereby loss of the latter substance, especially as the stripping off has to be carried out at an elevated temperature, e. g. 50° C. It need not be emphasised that high concentrations of acetic anhydride, such as are obtained in the present process, make the recovery thereof more economical than when reaction mixtures with a lower anhydride content are worked up.

The following examples illustrate various ways in which the invention may be carried into effect:

Example 1

In a coil reactor, which was constructed of stainless steel and has a coil of ¾″ internal diameter and 90′ length and which is immersed in a cooling liquid, acetaldehyde is continuously oxidised at 50° C. A separator with a diameter of 4″ is connected to the coil and is provided with a gas outlet, leading to a scrubber and with a pipe through which the liquid product separating therein is continuously withdrawn. A pipe connects the separator with a centrifugal pump by means of which the reaction liquid is circulated through the coil and the separator. A feed for fresh aldehyde is provided between the separator and the pump and an inlet for oxygen is connected to the system at a point near the entrance of the coil reactor through which inlet oxygen is fed into the system by means of a compresser.

The coil and the other parts of the circulating system are so dimensioned that the capacity of the coil is approximately equal to the remainder of the circulating system. The volume of the liquid in circulation was 8.87 litres. 20.8 litres per hour of fresh aldehyde was fed into the reaction mixture and the same amount of the reaction liquid was withdrawn per hour. Pure oxygen at a pressure of about 45 lbs./sq. in., was fed into the oxidation system, the amount of which was regulated in such a way, that the effluent mixture, in the steady state, contained about 55% anhydride. Per hour and litre of reaction liquid in circulation, at 50° C., 2,230 grams of total acids were produced. The effluent mixture in the steady state contained per litre 555 grams of acetic anhydride, 49 grams of acetaldehyde, 298 grams of acetic acid, and 120 grams of water, as well as 1.0 gram of copper and 0.2 gram of cobalt. The residence time for the reaction liquid in the system at 50° C. can be calculated herefrom as being 26 minutes. The rate of hydrolysis at 50° C. in a mixture as withdrawn continuously from the system is 0.09 mol./min. so that in one litre reaction liquid, in addition to 5.4 mols. of anhydride now found, originally another 0.09×26 (minutes) =2.34 mols. were present. As the total acid corresponds to 7.9 mols. acetic anhydride, the percentage of the total acid primarily formed as acetic anhydride is $$100 \times \frac{5.4+2.34}{7.9} = 97.9\%$$

The yield of acetic anhydride based on the weight of acetaldehyde converted was 64.8%.

Example 2

A closed stainless steel container is equipped with a cooling coil for circulating cooling brine which is disposed within the container and which is capable of maintaining the liquid mixture, during the reaction, at a uniform temperature of 50° C., and with a very efficient agitator. The total capacity of the container is about 10 litres. Through a feed-pipe acetaldehyde is introduced into the reaction mixture and through a pipe in the bottom of the container oxygen is pumped into the agitated reaction mixture which contains 0.2% of cobalt and 0.3% of copper, in the form of their acetates. 4500 litres (NTP) of oxygen (of 98% purity) per hour are fed into the system, the pressure at the entrance of the reaction zone being 50 lbs./sq. in. and 21.3 litres of acetaldehyde per hour were introduced whilst an equal amount of reaction liquid was withdrawn through an overflow so that the volume remained constant. With the aldehyde copper acetate and cobalt acetate are introduced in amounts replacing those contained in the reaction liquid which was withdrawn.

After working the system for a short period, the steady state is attained. The withdrawn mixture contained per litre 531 grams of acetic anhydride, 403 grams of acetic acid, 26 grams of acetaldehyde and 7 grams of per-compounds.

Per litre of reaction liquid contained in the reactor, 2,700 grams per hour of total acids were produced. 60.44% of the acetaldehyde which had been converted into acetic anhydride and acetic acid was recovered as acetic anhydride.

By reducing the cobalt concentrations from 0.2% to 0.02% but otherwise maintaining the conditions and the rate of oxidation as described above, the concentration of percompounds in the mixture rises to 1.4% and more, a concentration at which the oxidation tends to become irregular when slight variations of the temperature occur.

Alternatively, by restricting the acetaldehyde feed so that the withdrawn mixture contained only 0.9% to 1.5% of acetaldehyde, but otherwise maintaining the above conditions, the concentration of acetic anhydride in the reaction mixture dropped to 33% and less than 38% of the acetaldehyde converted into acetic anhydride and acetic acid was obtained as acetic anhydride although the rate of oxidation was kept the same and the concentration of percompounds was on an average less than 0.9%.

The accompanying diagrammatic drawings illustrate in Figure 1 a reactor 1 with acetaldehyde input 2, air input 3, stirrer 4 and offtake pipe 5; in Figure 2, a tubular reactor 6, in the form of a coil, with air input 7, acetaldehyde input 8, cooling bath 9 and offtake pipe 10; in Figure 3, a modification of the apparatus of Figure 2 in which the pipe 11 is utilised for recycling part of the reaction mixture withdrawn at 10 and in Figure 4 a modification of the apparatus of Figure 3 in which the pipe 11 includes a cooler 12.

We claim:

1. A continuous process for the production of acetic anhydride by the liquid phase oxidation of acetaldehyde by means of molecular oxygen at 45–55° C. with the aid of a copper and cobalt catalyst which comprises bringing molecular oxygen into intimate contact with a mixture containing acetic acid, acetaldehyde, at least 40% of acetic anhydride and an amount of water resulting from the reaction of acetaldehyde to produce such acetic anhydride, in which mixture is dissolved a copper-cobalt catalyst in an amount so that the concentration of the resulting copper compound, expressed in terms of metallic copper, is between 0.05% and 0.5%, and of the resulting cobalt compound, expressed in terms of metallic cobalt, is between 0.02% and 0.2%, continuously withdrawing a part of the reaction mixture and replacing said part by fresh acetaldehyde and catalyst to keep the concentration of catalyst in the reaction mixture within said limits, adjusting the withdrawal and the replacement in such a manner that the residence time of the reaction mixture in the system is not more than half an hour, continuously introducing molecular oxygen at such a rate that the acetic anhydride content in the reaction mixture is maintained at 40% at least, and the concentration of acetaldehyde therein between 2 to 7% and recovering the acetic anhydride from the part which is withdrawn.

2. A continuous process according to claim 1 wherein said molecular oxygen is of a purity of between 85% and 100%.

3. A continuous process according to claim 1 wherein the oxidation is effected under a superatmospheric pressure of between 1 atmosphere and 5 atmospheres.

4. A continuous process according to claim 1 wherein the amount of the copper catalyst used is such that the concentration of copper in the reaction mixture is between 0.1% and 0.3% thereof.

5. A continuous process according to claim 1 wherein the amount of the cobalt catalyst used is such that the concentration of cobalt in the reaction mixture is between 0.02% and 0.05% thereof.

6. A continuous process according to claim 1 wherein a part of the reaction mixture withdrawn from the reaction system is treated for the recovery of acetic anhydride therefrom and the remainder of the withdrawn reaction mixture is recycled to the reaction system in admixture with acetaldehyde.

7. A continuous process according to claim 1 wherein the copper catalyst and the cobalt catalyst are introduced into the reaction mixture in the form of their acetates.

ALEC ELCE.
HERBERT MUGGLETON STANLEY.
KARL HEINRICH WALTER TURCK.

REFERENCES CITED

The following references are of record in the file of this patent:

UNITED STATES PATENTS

| Number | Name | Date |
|---|---|---|
| 2,177,494 | Losch et al. | Oct. 24, 1939 |
| 2,293,104 | Bludworth | Aug. 18, 1942 |
| 2,514,041 | Elce et al. | July 4, 1950 |
| 2,575,159 | Chassaing et al. | Nov. 13, 1951 |

FOREIGN PATENTS

| Number | Country | Date |
|---|---|---|
| 589,940 | Great Britain | July 3, 1947 |
| 274,517 | Switzerland | July 2, 1951 |